US011802231B2

(12) United States Patent
Larsen et al.

(10) Patent No.: US 11,802,231 B2
(45) Date of Patent: Oct. 31, 2023

(54) PELLETIZED DIVERTING AGENTS USING DEGRADABLE POLYMERS (71) Applicant: Halliburton Energy Services, Inc., Houston, TX (US)

(72) Inventors: Travis Hope Larsen, Houston, TX (US); Larry Steven Eoff, Porter, TX (US); Aaron Michael Beuterbaugh, Spring, TX (US); Chris A. Lewis, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/090,589

(22) Filed: Dec. 29, 2022

(65) Prior Publication Data

US 2023/0136892 A1 May 4, 2023

Related U.S. Application Data (62) Division of application No. 16/970,710, filed as application No. PCT/US2018/032507 on May 14, 2018, now Pat. No. 11,572,497.

(51) Int. Cl.
*C09K 8/70* (2006.01)
*C09K 8/508* (2006.01)
(Continued)

(52) U.S. Cl.
CPC .............. *C09K 8/5083* (2013.01); *C09K 8/08* (2013.01); *C09K 8/514* (2013.01); *C09K 8/62* (2013.01);
(Continued)

(58) Field of Classification Search
None
See application file for complete search history.

(56) References Cited

U.S. PATENT DOCUMENTS 7,775,278 B2    8/2010   Willberg et al.
8,276,666 B2   10/2012   Ravi et al.
(Continued)

FOREIGN PATENT DOCUMENTS

CN    107287674    10/2017
WO    2017006077    1/2017

OTHER PUBLICATIONS

ISRWO International Search Report and Written Opinion for PCT/US2018/032507 dated Apr. 15, 2019.
(Continued)

*Primary Examiner* — Andrew Sue-Ako
(74) *Attorney, Agent, or Firm* — Thomas Rooney; C. Tumey Law Group PLLC (57) ABSTRACT

Accordingly, this disclosure describes systems, compositions, and methods that may use pelletized diverting agent particulates for diversion, fluid loss control, and/or other subterranean treatments for controlling fluid flow in subterranean formations. In an embodiment, a method comprising: introducing a treatment fluid into a wellbore penetrating a subterranean formation wherein the treatment fluid comprises: a base fluid; a pelletized diverting agent comprising a degradable polymer, wherein the pelletized diverting agent at least partially plugs a zone in the subterranean formation; and diverting at least a portion of the treatment fluid and/or a subsequently introduced fluid away from the zone. In an embodiment, a treatment fluid comprising: a base fluid; and a pelletized diverting agent comprising a degradable polymer.

20 Claims, 2 Drawing Sheets (51) Int. Cl.
  *E21B 43/27* (2006.01)
  *C09K 8/514* (2006.01)
  *C09K 8/62* (2006.01)
  *C09K 8/08* (2006.01)
  *E21B 33/138* (2006.01)
  *E21B 43/267* (2006.01)

(52) U.S. Cl.
  CPC .............. *C09K 8/70* (2013.01); *E21B 33/138* (2013.01); *E21B 43/267* (2013.01); *E21B 43/27* (2020.05)

(56) References Cited

U.S. PATENT DOCUMENTS

| | | | |
|---|---|---|---|
| 10,160,898 | B2 | 12/2018 | Maxey et al. |
| 11,572,497 | B2 * | 2/2023 | Larsen ................... C09K 8/80 |
| 2003/0060374 | A1 | 3/2003 | Cooke, Jr. |
| 2007/0029086 | A1 | 2/2007 | East, Jr. |
| 2008/0200352 | A1 * | 8/2008 | Willberg ................ C09K 8/516 166/280.1 |
| 2010/0200235 | A1 | 8/2010 | Luo et al. |
| 2011/0198084 | A1 | 8/2011 | Lockhart |
| 2011/0303415 | A1 | 12/2011 | Todd et al. |
| 2012/0285690 | A1 | 11/2012 | Weaver et al. |
| 2012/0285695 | A1 | 11/2012 | Lafferty et al. |
| 2013/0025860 | A1 | 1/2013 | Robb et al. |
| 2014/0076570 | A1 | 3/2014 | Nguyen |
| 2015/0027699 | A1 | 1/2015 | Loiseau et al. |
| 2015/0083423 | A1 | 3/2015 | Brannon et al. |
| 2015/0233226 | A1 | 8/2015 | Holzhauser et al. |
| 2016/0312111 | A1 * | 10/2016 | Okura .................... C08J 7/0427 |
| 2016/0362600 | A1 * | 12/2016 | Alwattari ................ C09K 8/92 |
| 2017/0233631 | A1 | 8/2017 | Ballard |
| 2018/0346800 | A1 | 12/2018 | Fu et al. |
| 2020/0063015 | A1 | 2/2020 | Lieng et al. |

OTHER PUBLICATIONS

Office Action Summary for U.S. Appl. No. 16/970,710 dated Sep. 14, 2021.
Final Office Action Summary for U.S. Appl. No. 16/970,710 dated Feb. 4, 2022.
Office Action Summary for U.S. Appl. No. 16/970,710 dated Apr. 4, 2022.
Final Office Action Summary for U.S. Appl. No. 16/970,710 dated Jul. 13, 2022.

* cited by examiner

PELLETIZED DIVERTING AGENTS USING DEGRADABLE POLYMERS

CROSS-REFERENCED TO RELATED APPLICATIONS

The present application is a divisional of U.S. application Ser. No. 16/970,710 filed on Aug. 18, 2020, which is the national stage entry of International Application No. PCT/US2018/032507 filed on May 14, 2018, which are incorporated herein by reference in their entirety for all purposes.

BACKGROUND

After a well bore is drilled and completed in a zone of a subterranean formation, it may often be necessary to introduce a treatment fluid into the zone. As used herein "zone" simply refers to a portion of the formation and does not imply a particular geological strata or composition. For example, the producing zone may be stimulated by introducing a hydraulic fracturing fluid into the producing zone to create fractures in the formation, thereby increasing the production of hydrocarbons therefrom. In another example, a producing zone may require an acid treatment to enhance fractures already present in the formation. To insure that the producing zone is uniformly treated with the treatment fluid, a treatment fluid comprising a diverting agent may be used to ensure the treatment fluid contacts the entire zone requiring treatment. A subterranean formation may have sections of varying permeability, reservoir pressures and/or varying degrees of formation damage, and thus may accept varying amounts of certain treatment fluids. For example, low reservoir pressure in certain areas of a subterranean formation or a rock matrix or a proppant pack of high permeability may permit that portion to accept larger amounts of certain treatment fluids. It may be difficult to obtain a uniform distribution of the treatment fluid throughout the entire treatment interval. For instance, the treatment fluid may preferentially enter portions of the interval with low fluid flow resistance at the expense of portions of the treatment interval with higher fluid flow resistance. In some instances, these intervals with variable flow resistance may be water-producing intervals.

In some methods of treating such subterranean formations, once the less fluid flow-resistant portions of a subterranean formation have been treated, that area may be sealed off using a variety of techniques to divert treatment fluids to more fluid flow-resistant portions of the interval. Such techniques may have involved, among other things, the injection of particulates, foams, emulsions, plugs, packers, or blocking polymers (e.g., crosslinked aqueous gels) into the interval so as to plug off high-permeability portions of the subterranean formation once they have been treated, thereby diverting subsequently injected fluids to more fluid flow-resistant portions of the subterranean formation.

In some techniques, a degradable polymer may be introduced into the wellbore and subsequently into the subterranean formation to bridge fractures and perforations to provide the diversion. Oftentimes, it is preferable to remove the degradable polymers after the treatment is completed to ensure maximum flow of formation fluids into the wellbore. Any degradable polymers remaining in the treated zone may reduce the effective permeability of the zone and thereby decrease formation fluid production rates.

BRIEF DESCRIPTION OF THE DRAWINGS

These drawings illustrate certain aspects of some of the present disclosure, and should not be used to limit or define the disclosure.

DETAILED DESCRIPTION

The present disclosure is directed to subterranean treatments, and, at least in part, to using a pelletized diverting agents for controlling flow of fluids in wellbore applications, such as in diversion applications. Although many degradable polymers have been previously used in diversion applications, there are several drawbacks such as high cost, low availability, and undesirable dissolution kinetics, among others. Herein, the use of pelletized diverting agents comprising degradable poly polymers is disclosed. The pelletized diverting agents may be used in fracturing, acidizing, and other wellbore operations to control the area of the formation where a treatment fluid is applied or acting on. An operator may choose to apply a pelletized diverting agent to a particular formation zone to block off the treatment fluid from acting in that zone. A pelletized diverting agent may be provided to plug perforations or bridge fractures in the formation thereby diverting the flow of a treatment fluid to another formation zone or flow path. Pelletized diverting agents may be delivered downhole by any suitable method. A non-limiting example may include, by way of treatment fluid. Pelletized diverting agents that comprise degradable polymers may have improved diversion, more rapid dissolution kinetics, especially at low temperatures, and reduced costs as compared to conventional diverting agents. For example, the pelletized diverting agents may be suitable for use at low temperatures, for example, in subterranean formations (or particular zones thereof) with temperature of about 100° C. or less. In an embodiment, the pelletized diverting agents may be suitable for use at temperatures of about 150° C. or less.

The treatment fluid may be any suitable treatment fluid for use in a variety of downhole applications. Suitable downhole applications may include, but are not limited to, drilling operations, lost circulation management operations, stimulation operations, sand control operations, perforating operations, completion operations, acidizing operations, scale inhibiting operations, water-blocking operations, clay stabilizer operations, fracturing operations, frac-packing operations, gravel packing operations, wellbore strengthening operations, sag control operations, displacing solids laden drilling fluid, the like, and/or any combinations thereof. The treatment fluid may have a density of about 8 lb/gal or greater. Suitable treatment fluids may have a density at a point in range of from about 8 lb/gal to about 13 lb/gal.

The treatment fluid may comprise a base fluid and a pelletized diverting agent. Examples of suitable base fluids may be aqueous or non-aqueous. Suitable non-aqueous fluids may include one or more organic liquids, such as hydrocarbons (e.g., kerosene, xylene, toluene, or diesel), oils (e.g., mineral oils or synthetic oils), esters, and the like. Suitable aqueous base fluids may comprise, without limitation, water, freshwater, saltwater, brine, seawater, or any other suitable base fluids that preferably do not undesirably interact with the other components used in the treatment fluids. Generally, the base fluid may be present in the treatment fluids in an amount in the range of from about 30% to about 100% by volume of the treatment fluid. For example, the base fluid may be present in the treatment fluids in an amount in the range of from about 65% to about 75% by volume of the treatment fluid.

The treatment fluid may further comprise a pelletized diverting agent that comprises a degradable polymer. As used herein, the phrase "pelletized diverting agent" refers to a diverting agent formed from the agglomeration of smaller particulates into a pellet, whether by compression, molding, or other suitable technique for pelletizing. Pelletized diverting agents may be solid in form. Pelletized diverting agents may be present in the treatment fluid in any amount for a particular application. Suitable amounts may include, but are not limited to, an amount of about 0.05% to about 75% by volume of the treatment fluid. In other examples, the Pelletized diverting agents may be present in the treatment fluid in an amount of about 0.05% to about 10% by volume of the treatment fluid, about 10% to about 20% by volume of the treatment fluid, about 20% to about 30% by volume of the treatment fluid, about 30% to about 40% by volume of the treatment fluid, or about 40% to about 50% by volume of the treatment fluid, or about 50% to about 60% by volume of the treatment fluid, or about 60% to about 75% by volume of the treatment fluid. These ranges encompass every number in between, for example. For example, the pelletized diverting agents may be present in the treatment fluid in an amount ranging from about 0.5% to about 65% by volume of the treatment fluid. One of ordinary skill in the art with the benefit of this disclosure should be able to select an appropriate amount of the proppant particulates to use for a particular application.

Pelletized diverting agents may be any suitable size capable of functioning as a lost circulation material, a bridging agent, a diverting agent, a plugging agent, the like, or any combination thereof. Suitable sizes may include a $D_v50$ particle size in the range from about 0.01 microns to about 100 microns, or from about 100 microns to about 10 millimeters, or from about 100 microns to about 2.5 millimeters, or from about 1 millimeter to about 10 millimeters. The $D_v50$ particle size may also be referred to as the median particle size by volume of a particulate material. The $D_v50$ particle size is defined as the maximum particle diameter below which 50% of the material volume exists. The $D_v50$ particle size values for a particular sample may be measured by commercially available particle size analyzers such as those manufactured by Malvern Instruments, Worcestershire, United Kingdom. Optionally, the pelletized diverting agent may have a $D_v50$ particle size that ranges in size from about 1 millimeter to about 5 millimeters, or from about 3 millimeters to about 10 millimeters. Pelletized diverting agents may be any suitable shape. Suitable shapes may include, but are not limited to, any physical shape as well as an irregular geometry, including the physical shape of platelets, shavings, fibers, flakes, ribbons, rods, strips, spheroids, beads, toroids, oviods, spheres, cylinders, tablets, wafers, or any other physical shape. In an embodiment, the pelletized diverting agents may have an aspect ratio of about 1:1 to about 20:1, or about 5:1 to about 10:1, or about 1:1 to about 10:1, or about 5:1 to about 20:1. It should be noted that any suitable aspect ratio within the given range above may be used.

Pelletized diverting agents may comprise a degradable polymer and be at least partially degradable. The terms "polymer" or "polymers" as used herein do not imply any particular degree of polymerization; for instance, oligomers are encompassed within this definition. A polymer is considered to be "degradable" herein if it is capable of undergoing an irreversible degradation when used in subterranean applications, e.g., in a well bore. The term "irreversible" as used herein means that the degradable material should degrade in situ (e.g., within a well bore) but should not recrystallize or reconsolidate in situ after degradation (e.g., in a well bore).

Degradable polymers may include, but not be limited to, dissolvable materials, materials that deform or melt upon heating such as thermoplastic materials, hydrolytically degradable materials, materials degradable by exposure to radiation, materials reactive to acidic fluids, or any combination thereof. In some embodiments, degradable materials may be degraded by temperature, presence of moisture, oxygen, microorganisms, enzymes, pH, free radicals, and the like. In some embodiments, degradation may be initiated in a subsequent treatment fluid introduced into the subterranean formation at some time when diverting is no longer necessary. In some embodiments, degradation may be initiated by a delayed-release acid, such as an acid-releasing degradable material or an encapsulated acid, and this may be included in the treatment fluid comprising the degradable material so as to reduce the pH of the treatment fluid at a desired time, for example, after introduction of the treatment fluid into the subterranean formation.

Any suitable degradable polymer may be used. Suitable degradable polymers may include polysaccharides such as cellulose; chitin; chitosan; aliphatic polyesters; and proteins. Such suitable polymers may be prepared by polycondensation reactions, ring-opening polymerizations, free radical polymerizations, anionic polymerizations, carbocationic polymerizations, coordinative ring-opening polymerizations, as well as by any other suitable process. Examples of specific degradable polymers that may be used in conjunction with the example methods include, but are not limited to, aliphatic poly(esters); poly(lactides); poly(glycolides); poly(ε-caprolactones); poly(hydroxyester ethers); poly(hydroxybutyrates); poly(anhydrides); polycarbonates; polyols; poly(orthoesters); poly(aminoacids); poly(ethyleneoxides); poly(phosphazenes); poly(etheresters), hydroxy propyl methylcellulose, pectin, polyethylene oxide, polyvinyl alcohol, alginate, polycaprolactone, gelatinised starch-based materials, polyester amides, polyamides, copolymers, terpolymers, and the like; and/or blends of any of these degradable polymers, and derivatives of these degradable polymers. As referred to herein, the term "derivative" is defined herein to include any compound that is made from one of the listed compounds, for example, by replacing one molecule in the base compound with another molecule or group of molecules. A specific example may include a combination of an aliphatic poly(ester) (e.g., poly(lactide) and polyvinyl alcohol. Other degradable polymers that are subject to hydrolytic degradation also may be suitable. One's choice may depend on the particular application and the conditions involved. Other guidelines to consider include the degradation products that result, the time required for the requisite degree of degradation, and the desired result of the degradation (e.g., voids). The degradable polymer may be of any suitable size. Suitable sizes may range from about 10 microns to about 2,000 microns. It should be noted that any size and/or size range within the specified range may be used.

In an embodiment, the degradable polymer may include polyvinyl alcohol (PVA) or another suitable polyol. PVA may be a solid material that may be manufactured in many forms, such as, for example, fibers, sheets, granules, beads, powder, and the like. PVA may be a synthetic polymer that may be water soluble and generally unaffected by petroleum hydrocarbons. The polymer comprises a carbon chain backbone with hydroxyl and acetate groups. PVA may be produced by the hydrolysis of polyvinyl acetate in methanol catalyzed by a base. PVA may exist in three different aggregation states, which may be controlled by solution conditions. In a solid state, PVA may be semi-crystalline. The degree of crystallinity varies from one mode of manufacture to another and with the degree of hydrolysis and grade of the PVA. In aqueous solution, PVA may lose crystallinity and swell to form an amorphous structure, which may be flexible and malleable, but not yet solubilized. Depending on solution conditions, PVA may solubilize completely and exist as polymer stands in solution.

PVA and similar polyols in aqueous media may be controlled by the salt content. In a brine of sufficiently high salt concentration, PVA may be insoluble but will become a sticky, flexible material that readily bonds to itself and to solid surfaces. By lowering the brine concentration below a critical salt level, however, the sticky PVA solids may become soluble and rapidly dissolve into solution.

Dissolution of PVA may be dependent on a number of factors, including, but not limited to, the degree of hydrolysis, molecular weight, crystallinity, particle size, exposure temperature, and the like of the PVA. The degree of hydrolysis may be defined as the mole percent of hydroxyl groups on the polymer chain in relation to the non-hydrolyzed acetate groups. For example, PVA with a degree of hydrolysis of 88 would have 88 mole percent hydroxyl groups and 12 mole percent acetate groups along the polymer backbone. The hydroxyl and/or acetate groups may be distributed randomly or in blocks. Other factors affecting PVA solubility may include polymer concentration and salt concentration; the amount of unsolubilized PVA, e.g., amorphous PVA, may increase with increased concentrations of salt or polymer. The crystallinity of the PVA may also be used to control the rate at which the PVA will dissolve at various temperatures.

The degradable polymer may be present in the pelletized diverting agent in any suitable amount, including, but not limited to, an amount in the range of from about 80% to about 100% by weight of the pelletized diverting agent. Degradable polymer may be present in the range from about 80% to about 90%, or about 90% to about 100%, or about 85% to about 95% by weight of pelletized diverting agent. Suitable amounts of degradable present in the pelletized diverting agent may include, but are not limited to, about 80%, about 85%, about 90%, about 95%, about 98%, about 99%, or about 100% by weight of pelletized diverting agent. It should be noted that these ranges encompass every number in between.

The pelletized diverting agent may be formed by compressing, molding, or otherwise agglomerating of small particulates to form larger pellets. Any pelletizing process capable of aggregating several smaller particles into larger particles may be used. Any suitable pelletization technique may be used to form the pelletized diverting agent. Suitable pelletization techniques may include, but are not limited to, agitation (i.e. balling, directed pelletization through centrifugation, etc.), compaction (i.e. compression, extrusion, etc.), layering (i.e. powder layering, solution/suspension layering, etc.), globulation (i.e. spray drying, spray congealing, etc.), and the like. The pelletized diverting agent may be solid in form. In an embodiment, a binder may be necessary when pelletizing the degradable polymer to help hold the agglomeration together. In an embodiment, a binder may not be necessary. Where present, any binder capable of holding the degradable polymers together may be used. Suitable binders may include, but are not limited to, sucrose, gelatin, starch, additional synthetic water-soluble polymers, microcrystalline cellulose, the like, and/or any combination thereof. Binders may be present in the pelletized diverting agent in any suitable amount, including, but not limited to, an amount less than 10% by weight of pelletized diverting agent. Binders may be present in the range from about 0.001% to about 10%, or about 0.1% to about 5%, or about 5% to about 10% by weight of pelletized diverting agent. Suitable amounts of binder present in the pelletized diverting agent may include, but are not limited to, about 0.001%, about 0.01%, about 0.1%, about 1%, about 2%, about 3%, about 4%, about 5%, about 6%, about 7%, about 8%, about 9%, or about 10% by weight of pelletized diverting agent. It should be noted that these ranges encompass every number in between.

As previously discussed, it may be preferable that a pelletized diverting agent introduced into the wellbore be at least partially dissolvable, degradable, or removable to ensure production of formation fluids may be minimally affected by the pelletized diverting agent. When the pelletized degradable polymer is soluble in water, the pelletized degradable polymer may be readily removed from the formation by waiting until the pelletized degradable polymer is dissolved. Where the pelletized degradable polymer is slightly soluble or may become soluble under certain conditions, a chemical agent that increases the solubility of the pelletized degradable polymer may be included. Any chemical agent capable of increasing the dissolution rate of the pelletized degradable polymer may be included. In a non-limiting example, the chemical agent may be, an inert dissolvable material, a dissolution accelerator, the like, or any combination thereof. In examples where the pelletized degradable polymer is insoluble in water, the pelletized degradable polymer may still allow production of formation fluids and provide additional beneficial properties to the near wellbore region such as propping of fractures.

Pelletized diverting agent may further comprise an inert dissolvable material. Inert dissolve materials may be included as a filler material for decreasing overall cost of the pelletized diverting agent, or increase the bridging performance, of the diverting agent, while also potentially increasing the overall dissolution rate of the pelletized diverting agent. Suitable inert dissolvable materials may include, but are not limited to, salts, inorganic compounds (i.e. calcium carbonate, sand, etc.), soluble organic compounds (i.e. waxes), the like, and/or any combination thereof. Inert dissolvable materials may be present in any suitable amount. Suitable amounts may include, but are not limited to, 1% to about 50% by weight of the pelletized diverting agent, or about 1% to about 25% by weight of the pelletized diverting agent, or about 25% to about 50% by weight of the pelletized diverting agent.

Pelletized diverting agent may further comprise a dissolution accelerator. Any suitable dissolution accelerator capable of increasing the overall dissolution rate of the pelletized diverting agent downhole may be used. Suitable dissolution accelerators may include, but are not limited to, inorganic acids, solid organic acids, simple saccharides, metal salts, the like, and/or any combination thereof. Suitable solid inorganic acids may include sulfamic acid. Suitable solid organic acids may include citric acid, ethylenediaminetetra-acetic acid (EDTA), N-Phosphonomehyl iminodiacetic acid (PMIDA), anhydrides, ortho esters, phosphonate esters, the like, and/or any combination thereof. Suitable simple saccharides, such as monosaccharides and disaccharides, may include gluctose, fructose, galactose, sucrose, and lactose. Combinations of suitable dissolution accelerators may also be used. Dissolution accelerators may be present in any suitable amount. Suitable amounts may include, but are not limited to, 1% to about 50% by weight of the pelletized diverting agent, or about 1% to about 10% by weight of the pelletized diverting agent, or about 10% to about 20% by weight of the pelletized diverting agent, or about 20% to about 30% by weight of the pelletized diverting agent, or about 30% to about 40% by weight of the pelletized diverting agent, or about 40% to about 50% by weight of the pelletized diverting agent.

Without limitation, placing the pelletized diverting agent into the subterranean formation may include placement into a wellbore or into the region of the subterranean formation surrounding the wellbore. In the subterranean formation, the pelletized diverting agent may form a barrier to fluid flow. Without limitation, this barrier to fluid flow may be used for controlling fluid, for example, in diversion to divert treatment fluids to another area, or in fluid loss control to reduce leak off into the subterranean formation. Advantageously, the pelletized diverting agent may be degradable so that they may be easily removed from the subterranean formation to facilitate production, for example, without the need for additional removal applications.

In addition to the pelletized diverting agent, the treatment fluid may comprise any number of additional additives, including, but not limited to, surfactants, acids, fluid loss control additives, gas, foamers, corrosion inhibitors, scale inhibitors, catalysts, clay control agents, biocides, friction reducing polymers, antifoam agents, bridging agents, dispersants, flocculants, $H_2S$ scavengers, $CO_2$ scavengers, oxygen scavengers, lubricants, gelling agents, breakers, weighting agents, particulate materials (e.g., proppant particulates) and any combination thereof. With the benefit of this disclosure, one of ordinary skill in the art should be able to recognize and select suitable additives for use in the treatment fluid.

In an embodiment, proppant particulates may be included in the treatment fluid. For example, where the treatment fluid is a fracturing fluid, the treatment fluid may transport proppant particulates into the subterranean formation. Examples of suitable proppant particulates may include, without limitation, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. Without limitation, the proppant particulates may comprise graded sand. Other suitable proppant particulates that may be suitable for use in subterranean applications may also be useful. Without limitation, the proppant particulates may have a particle size in a range from about 2 mesh to about 400 mesh, U.S. Sieve Series. The proppant particulates may be carried by the treatment fluid. Without limitation, the proppant particulates may be present in the treatment fluid in a concentration of about 0.1 pounds per gallon (ppg) to about 10 ppg, about 0.2 ppg to about 6 ppg. These ranges encompass every number in between, for example. For example, the concentration may range between about 0.5 ppg to about 4 ppg. One of ordinary skill in the art with the benefit of this disclosure should be able to select an appropriate amount of the proppant particulates to use for a particular application.

In an embodiment, the treatment fluid may be an acidic treatment fluid. The treatment fluid may be an aqueous acid treatment fluid, for example, when used in acidizing treatments. By way of example, the treatment fluid may comprise one or more acids, including, but not limited to, mineral acids, such as hydrochloric acid and hydrofluoric acid, organic acids, such as acetic acid, formic acid, and other organic acids, urea complexes, such as urea hydrochloride, chelating acids, such as ethylenediamine tetracetic acid, or mixtures thereof. In acidizing treatments, mixtures of hydrochloric acid and hydrofluoric may be used, in some instances.

In an embodiment, the treatment fluid may comprise a friction reducing polymer. The friction reducing polymer may be included in the treatment fluid to form a slickwater fluid, for example. The friction reducing polymer may be a synthetic polymer. Additionally, for example, the friction reducing polymer may be an anionic polymer or a cationic polymer. By way of example, suitable synthetic polymers may comprise any of a variety of monomeric units, including acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, acrylic acid esters, methacrylic acid esters and combinations thereof. Without limitation, the friction reducing polymer may be included in the treatment fluid to provide a desired amount of friction reduction. For example, the friction reducing polymer may be included in the treatment fluid, for example, in an amount equal to or less than 0.2% by weight of an aqueous-based fluid present in the treatment fluid. Without limitation, the friction reducing polymer may be included in the treatment fluid in an amount sufficient to reduce friction without gel formation upon mixing. By way of example, the treatment fluid comprising the friction reducing polymer may not exhibit an apparent yield point.

In an embodiment, the treatment fluid may comprise a gelling agent. The gelling agent may be included in the treatment fluid to form an aqueous gel, foamed gel, or oil gel, for example. Suitable gelling agents may comprise any polymeric material capable of increasing the viscosity of a base fluid, such as an aqueous fluid. Without limitation, the gelling agent may comprise polymers that have at least two molecules that may be capable of forming a crosslink in a crosslinking reaction in the presence of a crosslinking agent, and/or polymers that have at least two molecules that are so crosslinked (i.e., a crosslinked gelling agent). Other suitable gelled fluids may include linear gels that are not crosslinked. The gelling agents may be naturally-occurring, synthetic, or a combination thereof. Suitable gelling agents may comprise polysaccharides, and derivatives thereof that contain one or more of these monosaccharide units: galactose, mannose, glucoside, glucose, xylose, arabinose, fructose, glucuronic acid, or pyranosyl sulfate. Examples of suitable polysaccharides include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")), cellulose derivatives (e.g., hydroxyethyl cellulose, carboxyethylcellulose, carboxymethylcellulose, and carboxymethylhydroxyethylcellulose), and combinations thereof. The gelling agents comprise an organic carboxylated polymer, such as CMHPG. Additionally, polymers and copolymers that comprise one or more functional groups (e.g., hydroxyl, cis-hydroxyl, carboxylic acids, derivatives of carboxylic acids, sulfate, sulfonate, phosphate, phosphonate, amino, or amide groups) may be used. Where used, the gelling agent may be present in the treatment fluids in an amount sufficient to provide the desired viscosity. Without limitation, the gelling agents may be present in an amount in the range of from about 0.10% to about 10% by weight of the treatment fluid and, alternatively, from about 0.5% to about 4% by weight of the treatment fluid.

In an embodiment, a crosslinking agent may be included in the treatment fluids where it is desirable to crosslink the gelling agent. The crosslinking agent may comprise a metal ion that is capable of crosslinking at least two molecules of the gelling agent. Examples of suitable crosslinking agents include, but are not limited to, borate ions, zirconium IV ions, titanium IV ions, aluminum ions, antimony ions, chromium ions, iron ions, copper ions, magnesium ions, and zinc ions. These ions may be provided by providing any compound that is capable of producing one or more of these ions; examples of such compounds include, but are not limited to, boric acid, disodium octaborate tetrahydrate, sodium diborate, pentaborates, ulexite, colemanite, zirconium lactate, zirconium triethanol amine, zirconium lactate triethanolamine, zirconium carbonate, zirconium acetylacetonate, zirconium maleate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, aluminum citrate, antimony compounds, chromium compounds, iron compounds, copper compounds, zinc compounds, and combinations thereof. Without limitation, the crosslinking agent may be formulated to remain inactive until it is "activated" by, among other things, certain conditions in the fluid (e.g., pH, temperature, etc.) and/or contact with some other substance. Without limitation, the crosslinking agent may be delayed by encapsulation with a coating (e.g., a porous coating through which the crosslinking gent may diffuse slowly, or a degradable coating that degrades downhole) that delays the release of the crosslinking agent until a desired time or place. The choice of a particular crosslinking agent will be governed by several considerations that will be recognized by one skilled in the art, including but not limited to the following: the type of gelling agent included, the molecular weight of the gelling agent(s), the pH of the treatment fluid, temperature, and/or the desired time for the crosslinking agent to crosslink the gelling agent molecules.

Where used, suitable crosslinking agents may be present in the treatment fluids in an amount sufficient to provide, inter alia, the desired degree of crosslinking between molecules of the gelling agent. Without limitation, the crosslinking agent may be present in the treatment fluids of the present treatment fluids in an amount in the range of from about 0.0005% to about 0.2% by weight of the treatment fluid or alternatively from about 0.001% to about 0.05% by weight of the treatment fluid. One of ordinary skill in the art, with the benefit of this disclosure, should recognize the appropriate amount of crosslinking agent to include in a treatment fluid based on, among other things, the temperature conditions of a particular application, the type of gelling agents used, the molecular weight of the gelling agents, the desired degree of viscosification, and/or the pH of the treatment fluid.

In an embodiment, the treatment fluid may further comprise a gel breaker, which may be useful for reducing the viscosity of the viscosified fracturing fluid at a specified time, A gel breaker may comprise any compound capable of lowering the viscosity of a viscosified fluid. The term "break" (and its derivatives) as used herein refers to a reduction in the viscosity of the viscosified treatment fluid, e.g., by the breaking or reversing of the crosslinks between polymer molecules or some reduction of the size of the gelling agent polymers. No particular mechanism is implied by the term. Suitable gel breaking agents for specific applications and gelled fluids are known to one skilled in the arts, Nonlimiting examples of suitable breakers include oxidizers, peroxides, enzymes, acids, and the like. Some viscosified fluids also may break with sufficient exposure of time and temperature.

Example methods of using the pelletized diverting agent will now be described in more detail. As previously described, the pelletized diverting agent may be placed in the subterranean formation such that a barrier to fluid flow may be formed. Without limitations, the pelletized diverting agent may form packs, bridges, filter cakes, or other suitable barriers to thereby obstruct fluid flow. Without limitation, this barrier to fluid flow may be used, for example, in diversion to divert treatment fluids to another area and in fluid loss control to reduce leak off into the subterranean formation. The fluid flow preventing barrier may be formed in the subterranean formation to block certain flow paths in the subterranean formation, reducing the flow of fluids through the subterranean formation. Examples of the types of flow paths that may be blocked by the fluid flow preventing barrier include, but are not limited to, perforations, such as those formed by a perforation gun, fissures, cracks, fractures, micro fractures, streaks, flow channels, voids, vugs high permeable streaks, annular voids, or combinations thereof, as well as any other zone in the formation through which fluids may undesirably flow.

As will be appreciated by those of ordinary skill in the art, the pelletized diverting agent may be used in a variety of subterranean operations, where formation of a fluid flow diverting (or flow preventing) barrier may be desired, such as fluid diversion, and fluid loss control. Fluid diversion may be desired in a number of subterranean treatments, including fracturing and acidizing. Fluid loss control may be desired in a number of subterranean treatments, including, without limitation, drilling operations, fracturing operations, acidizing operations, and gravel packing operations. The pelletized diverting agent may be used prior to, during, or subsequent to a variety of subterranean operations. Methods of using the pelletized diverting agent may first include preparing a treatment fluid comprising the pelletized diverting agent. The treatment fluids may be prepared in any suitable manner, for example, by combining the pelletized diverting agent, base fluid, and any of the additional components described herein in any suitable order.

Methods may include introduction of the pelletized diverting agent into a subterranean formation. Introduction into the subterranean formation is intended to include introduction into a wellbore penetrating a subterranean formation, introduction into the zone(s) surrounding the wellbore, or both. A treatment fluid containing the pelletized diverting agent may dissipate into the subterranean formation through openings, which may be naturally occurring (e.g., pores, cracks, fractures, micro fractures fissures, etc.) or man-made. As the treatment fluid dissipates into the subterranean formation, the pelletized diverting agent may be screened out by the formation, whereby the pelletized diverting agent may be packed into the openings. In the subterranean formation, the pelletized diverting agent may form a flow preventing barrier that blocks certain flow paths therein, reducing the flow of fluids through the subterranean formation. Examples of the types of flow paths that may be blocked by the pelletized diverting agent include, but are not limited to, perforations, such as those formed by a perforation gun, fissures, cracks, fractures, micro fractures, streaks, flow channels, voids, high permeable streaks, annular voids, or combinations thereof, as well as any other zone in the formation through which fluids may undesirably flow. Methods may further include selecting one or more zones of the subterranean formation for control of fluid flow in which the pelletized diverting agent may be introduced. In an embodiment, additional treatment fluids may be introduced into the wellbore, wherein the treatment fluids may contain additional pelletized diverting agents or other diverting agents. The pelletized diverting agents (or other diverting agents) in each treatment fluid may be different sizes. In an embodiment, the first treatment fluid may comprise large pelletized diverting agents and each subsequent diverting agent (or pelletized diverting agent) may decrease in size. In addition, additional solid diverting agents (or pelletized diverting agents) may be included in each treatment fluid so that plugs may be formed with particles of different sizes.

The pelletized diverting agent may be used as fluid loss control agents, among others. Providing effective fluid loss control for subterranean treatment fluids may be highly desirable. "Fluid loss," as that term is used herein, refers to the undesirable migration or loss of fluids (such as the fluid portion of a drilling mud or cement slurry) into a subterranean formation and/or a proppant pack. Treatment fluids may be used in any number of subterranean operations, including drilling operations, cementing, fracturing operations, acidizing operations, gravel-packing operations, well bore clean-out operations, pickling, and the like. Fluid loss may be problematic in any number of these operations. In fracturing treatments, for example, fluid loss into the formation may result in a reduction in fluid efficiency, such that the fracturing fluid cannot propagate the fracture as desired. Fluid loss control materials are additives that lower the volume of a filtrate that passes through a filter medium. That is, they block the pore throats and spaces that otherwise allow a treatment fluid to leak out of a desired zone and into an undesired zone. Particulate materials may be used as fluid loss control materials in subterranean treatment fluids to fill/bridge the pore spaces in a formation matrix and/or proppant pack and/or to contact the surface of a formation face and/or proppant pack, thereby forming a type of filter cake that blocks the pore spaces in the formation or proppant pack, and prevents fluid loss therein. Without limitation, when the pelletized diverting agent particulates may be used as a fluid loss control agent, it may be used in conjunction with a fracturing or drilling operation. For example, the pelletized diverting agent may be included in a treatment fluid that is then placed into the portion of the subterranean formation at a pressure/rate sufficient to create or extend at least one fracture in that portion of the subterranean formation.

Pelletized diverting agents have similar actions but strive for a somewhat different approach. Pelletized diverting agents may be used to seal off a portion of the subterranean formation. By way of example, in order to divert a treatment fluid from permeable portions of the formation into the less permeable portions of the formation, a volume of treatment fluid may be pumped into the formation followed by pelletized diverting agent to seal off a portion of the formation where the first treatment fluid penetrated. When desired for diversion, the pelletized diverting agent may be added to the first treatment fluid or a slug of another treatment fluid may be prepared that contains the pelletized diverting agent.

After the pelletized diverting agent is placed, a second treatment fluid may be placed wherein the second treatment fluid may be diverted to a new zone for treatment by the previously placed pelletized diverting agent. When being placed, the treatment fluid containing the pelletized diverting agent may flow most readily into the portion of the formation having the largest pores, fissures, or vugs, until that portion is bridged and sealed, thus diverting the remaining fluid to the next most permeable portion of the formation. These steps may be repeated until the desired number of stages of treating fluid has been pumped. In an embodiment, the pelletized diverting agent in the first treatment fluid may be smaller than the pelletized diverting agent in the second treatment fluid. Without limitation, pelletized diverting agents may be included in treatment fluids introduced at matrix flow rates; that is, flow rates and pressures that are below the rate/pressure sufficient to create or extend fractures in that portion of a subterranean formation. Alternatively, the treatment fluids comprising pelletized diverting agent may be introduced above the fracturing pressure of the subterranean formation.

As previously described, the pelletized diverting agent may be used in fracturing treatments. A method of fracturing a wellbore may comprise placing a fracturing fluid into a portion of a wellbore. The fracturing fluid may be used to create or extend one or more fractures in the subterranean formation. The fracturing fluid may enter flow paths to create one or more primary fractures extending from the wellbore into the subterranean formation. Branches may extend from the primary fractures. A fracturing fluid, commonly referred to as a pre-pad or pad fluid, may be injected to initiate the fracturing of a subterranean formation prior to the injection of proppant particulates. The pre-pad or pad fluid may be proppant-free or substantially proppant-free. The proppant particulates may be suspended in a fracturing fluid which may be injected into the subterranean formation to create and/or extend at least one fracture. In order to create and/or extend a fracture, a fluid is typically injected into the subterranean formation al a rate sufficient to generate a pressure above the fracturing pressure.

In the fracturing treatment, it may be desired to plug previously formed flow paths in order to fracture additional portions of the subterranean formation. The pelletized diverting agent may be introduced into the subterranean formation to form a barrier that restricts entry of additional fracturing fluid within the previously formed flow paths. An example method may include introducing a fracturing fluid into a subterranean formation at or above a fracturing pressure of the subterranean formation. The method may further include introducing a pelletized diverting agent into the subterranean formation to thereby form a barrier that restricts fluid flow at a first location in the subterranean formation. The method may further include diverting the fracturing fluid to a second location in the subterranean formation. The pelletized diverting agent may be placed into the subterranean formation by forming a slug of a treatment fluid having a different composition than the fracturing fluid or by adding the pelletized diverting agent directly to the fracturing fluid, for example, creating a slug of the fracturing fluid comprising the pelletized diverting agent. The pelletized diverting agent may form a barrier at the first location to selectively place the fracturing fluid at one or more additional locations in the subterranean formation.

After a well treatment using the pelletized diverting agent, the wellbore and/or the subterranean formation may be prepared for production, for example, production of a hydrocarbon, therefrom. Preparing the wellbore and/or formation for production may comprise removing the pelletized diverting agent from one or more flow paths, for example, by allowing the pelletized diverting agent to degrade and subsequently recovering hydrocarbons from the formation via the wellbore. As previously described, the pelletized diverting agent may be degradable such that the barrier formed by the pelletized diverting agent may be removed. The degradable material may be degraded by materials purposely placed in the formation by injection, mixing the degradable particle with delayed reaction degradation agents, or other suitable means previously described to induce degradation.

Removal of the pelletized diverting agent particulates, if desired, may be effected by any number of suitable treatments. By way of example, the pelletized diverting agent may be removed by acid hydrolysis and/or by contact with oxidizers. Removal may include contacting the pelletized diverting agent with an oxidizer, such as persulfate, alkali metal chlorite or hypochlorite, peroxides, ammonium or metal chlorate, bromate, iodates or perchlorate, perbromate, or periodate. Without limitation, specific examples of suitable oxidizers may include sodium persulfate, ammonium persulfate, potassium persulfate, lithium hypochlorite, or sodium hypochlorite, calcium hypochlorite, sodium chlorate, sodium bromate, sodium iodate, sodium perchlorate, sodium perbromate, sodium periodate, potassium chlorate, potassium bromate, potassium iodate, potassium perchlorate, potassium perbromate, potassium periodate, ammonium chlorate, ammonium bromate, ammonium iodate, ammonium perchlorate, ammonium perbromate, ammonium periodate, magnesium chloride, magnesium bromate, magnesium iodate, magnesium perchlorate, magnesium perbromate, magnesium periodate, zinc chlorate, zinc bromate, zinc iodate, zinc perchlorate, zinc perbromate, zinc periodate, sodium perborate, t-butyl hydroperoxide, or combinations thereof. The oxidizer may be introduced into the formation by way of the wellbore. Without limitation, the pelletized diverting agent particulates may be susceptible to hydrolysis by acids.

Accordingly, this disclosure describes systems, compositions, and methods that may use pelletized diverting agent particulates for diversion, fluid loss control, and/or other subterranean treatments for controlling fluid flow in subterranean formations. Without limitation, the systems, compositions, and methods may include any of the following statements:

Statement 1: A method comprising: introducing a treatment fluid into a wellbore penetrating a subterranean formation wherein the treatment fluid comprises: a base fluid; a pelletized diverting agent comprising a degradable polymer, wherein the pelletized diverting agent at least partially plugs a zone in the subterranean formation; and diverting at least a portion of the treatment fluid and/or a subsequently introduced fluid away from the zone.

Statement 2: The method of statement 1, wherein the degradable polymer comprises polyvinyl alcohol.

Statement 3: The method of statements 1 or 2, wherein the degradable polymer comprises at least one polymer selected from the group consisting of aliphatic poly(ester); poly (lactide); poly(glycolide); poly(ε-caprolactone); poly(hydroxyester ether); poly(hydroxybutyrate); poly(anhydride); polycarbonate; polyol; poly(orthoester); poly(aminoacid); poly(ethyleneoxide); poly(phosphazene); poly(etherester), hydroxy propyl methylcellulose, pectin, polyethylene oxide, polyvinyl alcohol, alginate, polycaprolactone, gelatinised starch-based material, polyester amide, polyamide, and any combination thereof.

Statement 4: The method of any one of statements 1 to 3, wherein the pelletized diverting agent has a $D_v50$ particle size of about 100 microns to about 10 millimeters.

Statement 5: The method of any one of statements 1 to 4, wherein the pelletized diverting agent further comprises a binder.

Statement 6: The method of any one of statements 1 to 5, wherein the binder comprises at least one material selected from the group consisting of sucrose, gelatin, starch, a synthetic water-soluble polymer, microcrystalline cellulose, and any combination thereof.

Statement 7: The method of any one of statements 1 to 6, wherein the pelletized diverting agent further comprises a dissolution accelerator selected from the group consisting of an inorganic acid, a solid organic acid, and a simple saccharide.

Statement 8: The method of any one of statements 1 to 7, further comprising introducing an additional diverting agent into the zone, wherein the pelletized diverting agent has a $D_v50$ particle size that is larger than the additional diverting agent, wherein the additional diverting agent forms the plug with the pelletized diverting agent.

Statement 9: The method of any one of statements 1 to 8, further comprising allowing the pelletized diverting agent to dissolve.

Statement 10: The method of any one of statements 1 to 9, further comprising introducing a fracturing fluid into the wellbore wherein the fracturing fluid comprises a proppant.

Statement 11: The method of any one of statements 1 to 10, wherein the treatment fluid is injected into the wellbore at or above a fracture gradient of the subterranean formation and the treatment fluid is intermittently injected into the wellbore while the fracturing fluid is injected into the wellbore.

Statement 12: The method of any one of statements 1 to 11, wherein prior to the step of introducing, the method further comprising mixing the treatment fluid in a mixer, wherein the introducing comprising pumping the treatment fluid into the wellbore with a pump.

Statement 13: The method of any one of statements 1 to 12, wherein the degradable polymer comprises polyvinyl alcohol, wherein the pelletized diverting agent further comprises a binder in an amount of about 0.001% to about 10% by weight of the pelletized diverting agent, wherein the pelletized diverting agent further comprises a dissolution accelerator in an amount of about 1% to about 30% by weight of the pelletized diverting agent, wherein the dissolution accelerator is selected from the group consisting of an inorganic acid, a solid organic acid, and a simple saccharide, wherein the pelletized diverting agent has a $D_v50$ particle size of about 1 millimeter to about 10 millimeters, and wherein the zone has a temperature of about 100° C. or less.

Statement 14: A treatment fluid comprising: a base fluid; and a pelletized diverting agent comprising a degradable polymer.

Statement 15: The treatment fluid of statement 14, wherein the pelletized diverting agent further comprises a dissolution accelerator selected from the group consisting of an inorganic acid, a solid organic acid, and a simple saccharide.

Statement 16: The treatment fluid of statements 14 or 15, wherein the pelletized diverting agent comprises polyvinyl alcohol.

Statement 17: The treatment fluid of any one of statements 14 to 16, wherein the degradable polymer comprises at least one polymer selected from the group consisting of aliphatic poly(ester); poly(lactide); poly(glycolide); poly(ε-caprolactone); poly(hydroxyester ether); poly(hydroxybutyrate); poly(anhydride); polycarbonate; polyol; poly(orthoester); poly(aminoacid); poly(ethyleneoxide); poly(phosphazene); poly(etherester), hydroxy propyl methylcellulose, pectin, polyethylene oxide, polyvinyl alcohol, alginate, polycaprolactone, gelatinised starch-based material, polyester amide, polyamide, and any combination thereof.

Statement 18: The treatment fluid of any one of statements 14 to 17, wherein the pelletized diverting agent has a $D_v50$ particle size of about 100 microns to about 10 millimeters.

Statement 19: The treatment fluid of any one of statements 14 to 18, wherein degradable polymer comprises at least one binder selected from the group comprising sucrose, gelatin, starch, a synthetic water-soluble polymer, microcrystalline cellulose, and combination thereof.

Statement 20: The treatment fluid of any one of statements 14 to 19, wherein the base fluid comprises water.

Figure 1:
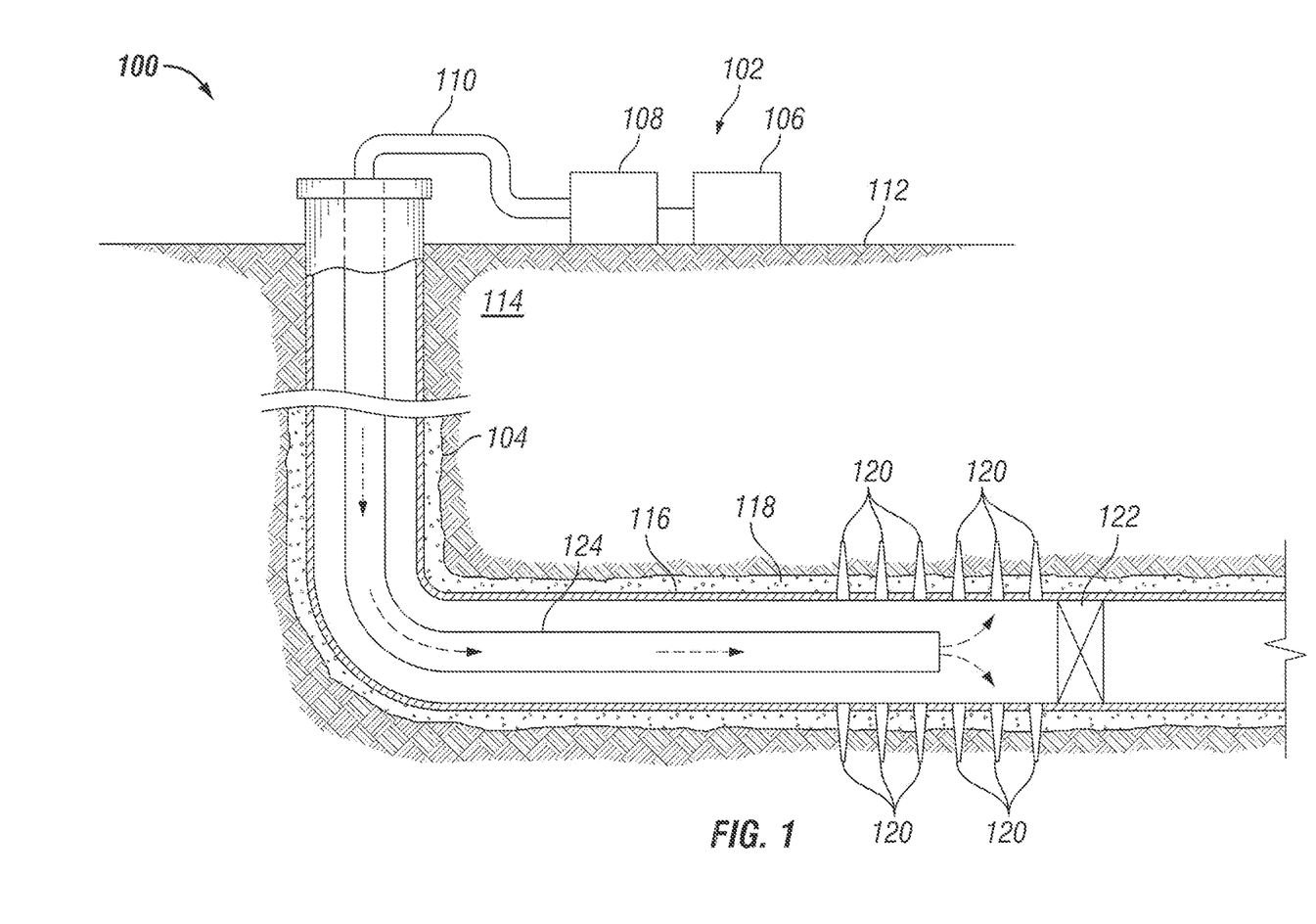
FIG. 1 is a schematic illustration of example well system showing placement of a treatment fluid into a wellbore.

Example methods of using the pelletized diverting agent particulates will now be described in more detail with reference to FIG. 1. Any of the previous examples of the pelletized diverting agent particulates may apply in the context of FIG. 1. FIG. 1 illustrates an example well system 100 that may be used for preparation and delivery of a treatment fluid downhole. It should be noted that while FIG. 1 generally depicts a land-based operation, those skilled in the art will readily recognize that the principles described herein are equally applicable to subsea operations that employ floating or sea-based platforms and rigs, without departing from the scope of the disclosure.

Referring now to FIG. 1, a fluid handling system 102 is illustrated. The fluid handling system 102 may be used for preparation of a treatment fluid comprising the pelletized diverting agent and for introduction of the treatment fluid into a wellbore 104. The fluid handling system 102 may include mobile vehicles, immobile installations, skids, hoses, tubes, fluid tanks or reservoirs, pumps, valves, and/or other suitable structures and equipment. As illustrated, the fluid handling system 102 may comprise a fluid supply vessel 106, pumping equipment 108, and wellbore supply conduit 110. While not illustrated, the fluid supply vessel 106 may contain one or more components of the treatment fluid pelletized diverting agent particulates, base fluid, etc.) in separate tanks or other containers that may be mixed at any desired time. Pumping equipment 108 may be fluidically coupled with the fluid supply vessel 106 and wellbore supply conduit 110 to communicate the treatment fluid into wellbore 104. Fluid handling system 102 may also include surface and downhole sensors (not shown) to measure pressure, rate, temperature and/or other parameters of treatment. Fluid handling system 102 may also include pump controls and/or other types of controls for starting, stopping, and/or otherwise controlling pumping as well as controls for selecting and/or otherwise controlling fluids pumped during the injection treatment, An injection control system may communicate with such equipment to monitor and control the injection of the treatment fluid. As depicted in FIG. 1, the fluid supply vessel 106 and pumping equipment 108 may be above the surface 112 while the wellbore 104 is below the surface 112. As will be appreciated by those of ordinary skill in the art, well system 100 may be configured as shown in FIG. 1 or in a different manner, and may include additional or different features as appropriate. By way of example, fluid handling system 102 may be deployed via skid equipment, marine vessel, or may be comprised of sub-sea deployed equipment.

Without continued reference to FIG. 1, well system 100 may be used for introduction of a treatment fluid into wellbore 104. The treatment fluid may contain a base fluid (which may be oil- or aqueous-based) and pelletized diverting agent, described herein. Generally, wellbore 104 may include horizontal, vertical, slanted, curved, and other types of wellbore geometries and orientations. Without limitation, the treatment fluid may be applied through the wellbore 104 to subterranean formation 114 surrounding any portion of wellbore 104. As illustrated, the wellbore 104 may include a casing 116 that may be cemented (or otherwise secured) to wellbore wall by cement sheath 118. Perforations 120 allow the treatment fluid and/or other materials to flow into and out of the subterranean formation 114. A plug 122, which may be any type of plug (e.g., bridge plug, etc.) may be disposed in wellbore 104 below the perforations 120 if desired. While FIG. 1 illustrates used of treatment fluid in a cased section of wellbore 104, it should be understood that treatment fluid may also be used in portions of wellbore 104 that are not cased.

The treatment fluid comprising the pelletized diverting agent may be pumped from fluid handling system 102 down the interior of casing 116 in wellbore 104. As illustrated, well conduit 124 (e.g., coiled tubing, drill pipe, etc.) may be disposed in casing 116 through which the treatment fluid may be pumped. The well conduit 124 may be the same or different than the wellbore supply conduit 110. For example, the well conduit 124 may be an extension of the wellbore supply conduit 110 into the wellbore 104 or may be tubing or other conduit that is coupled to the wellbore supply conduit 110. The treatment fluid may be allowed to flow down the interior of well conduit 124, exit the well conduit 124, and finally enter subterranean formation 114 surrounding wellbore 104 by way of perforations 120 through the casing 116 (if the wellbore is cased as in FIG. 1) and cement sheath 118. Without limitation, the treatment fluid may be introduced into subterranean formation 114 whereby one or more fractures (not shown) may be created or enhanced in subterranean formation 114. For example, the treatment fluid may be introduced into subterranean formation 114 at or above a fracturing pressure. As previously, described, the treatment fluid comprising the pelletized diverting agent particulates may be placed into the subterranean formation 114 after a previous treatment has been performed such that additional locations in the subterranean formation 114 may be treated. Without limitation, at least a portion of the pelletized diverting agent may be deposited in the subterranean formation 114. As previously described, the pelletized diverting agent may form a barrier to fluid flow in the subterranean formation.

As previously described, a variety of treatments may be performed using the pelletized diverting agent. Suitable subterranean treatments may include, but are not limited to, drilling operations, production stimulation operations (e.g., fracturing, acidizing), and well completion operations (e.g., gravel packing or cementing). These treatments may generally be applied to the subterranean formation. The barrier to fluid flow formed in the subterranean formation 114 by the pelletized diverting agent may be used in these treatments for diversion and fluid loss control, among others. For example, the diversion of the treatment fluids may help ensure that the treatment fluids are more uniformly distributed in the subterranean formation.

Figure 2A:
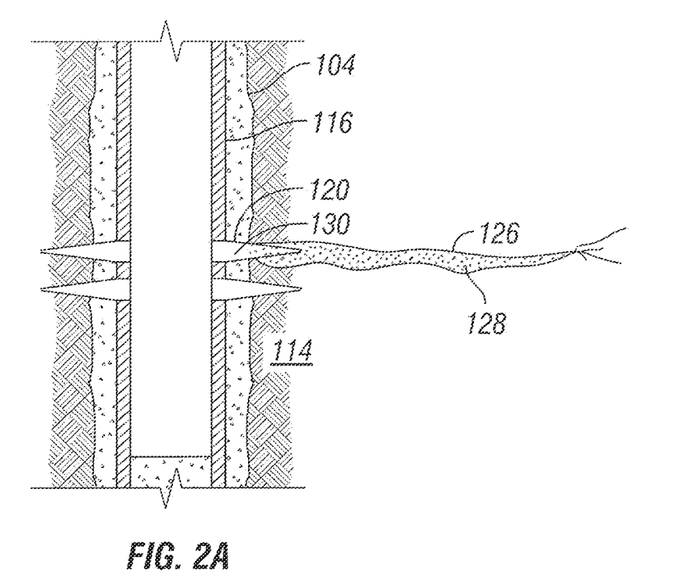
FIGS. 2a and 2b are schematic illustrations showing use of pelletized diverting agent particulates in an example fracturing treatment.

The well treatment may comprise a fracturing treatment in which one or more fractures may be created in subterranean formation 114. Referring now to FIG. 2A, fracture 126 is shown extending from wellbore 104. The fracturing of the subterranean formation 114 may be accomplished using any suitable technique. By way of example, a fracturing treatment may include introducing a fracturing fluid into subterranean formation 114 at or above a fracturing pressure. The fracturing fluid may be introduced by pumping the fracturing fluid through casing 116, perforations 120, and into subterranean formation 114 surrounding wellbore 104. Alternatively, a jetting tool (not shown) may be used to initiate the fracture 126. The fracturing fluid may comprise proppant particulates which may be deposited on the fracture 126 to form a proppant pack 128.

Figure 2B:
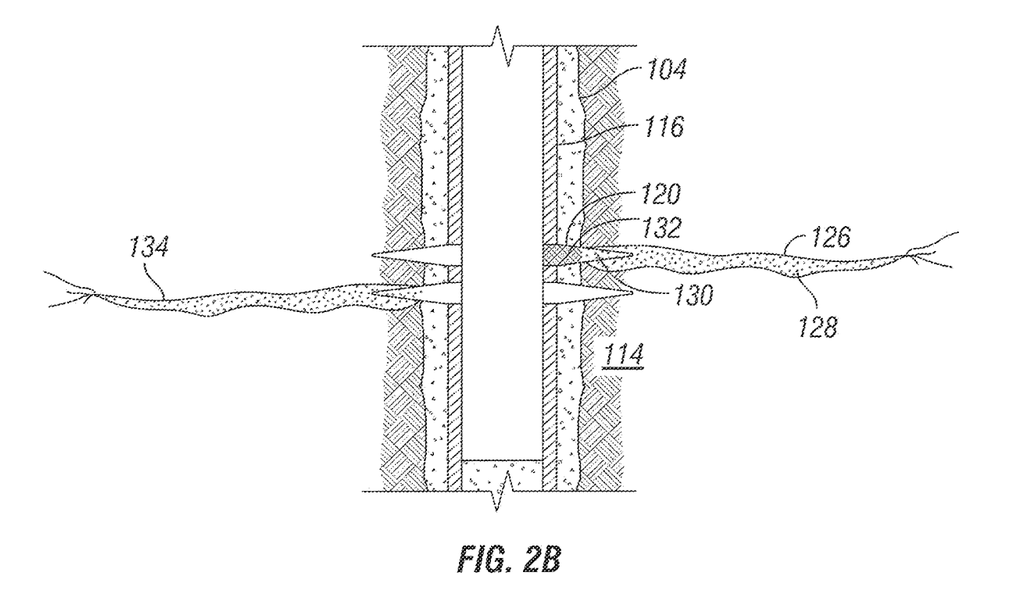

To form a barrier that can divert the fracturing fluid to additional flow paths, the pelletized diverting agent may be introduced into the subterranean formation 114. The pelletized diverting agent may be carried into the subterranean formation 114 in a treatment fluid. The pelletized diverting agent may be introduced through the perforation 120 and into a perforation tunnel 130. Without limitation, the treatment fluid comprising the pelletized diverting agent may be a slug of the fracturing fluid comprising the pelletized diverting agent or a separate treatment fluid comprising the pelletized diverting agent. The treatment fluid comprising the pelletized diverting agent may be introduced above the fracturing pressure or at matrix flow rates. Without limitation, the proppant pack 128 may act as a filter screening the pelletized diverting agent out of the treatment fluid. As a result, a layer or pack of the pelletized diverting agent may form on the proppant particulates, in the perforation tunnel 130, or both. As shown in FIG. 2B, a barrier 132 comprising the pelletized diverting agent may be formed in the perforation tunnel 130. The resulting barrier 132 may be able to divert fluids away from fracture 126. Such diversion may result in a back pressure build up that may be detected at surface 112 (e.g., shown on FIG. 1). After formation of the barrier 132, additional subterranean treatments may be performed. As shown on FIG. 2B, additional fracture 134 may be created in subterranean formation 114. Additional fracture 134 may be formed, for example, in a portion of subterranean formation 114 with least resistance to fluid flow, as barrier 132 has diverted the fracturing fluid into additional portions of the subterranean formation 114 in which treatment may be desired.

The exemplary pelletized diverting agent particulates disclosed herein may directly or indirectly affect one or more components or pieces of equipment associated with the preparation, delivery, recapture, recycling, reuse, and/or disposal of the pelletized diverting agent particulates. For example, the pelletized diverting agent particulates may directly or indirectly affect one or more mixers, related mixing equipment, mud pits, storage facilities or units, composition separators, heat exchangers, sensors, gauges, pumps, compressors, and the like used to generate, store, monitor, regulate, and/or recondition the sealant composition. The pelletized diverting agent particulates may also directly or indirectly affect any transport or delivery equipment used to convey the pelletized diverting agent particulates to a well site or downhole such as, for example, any transport vessels, conduits, pipelines, trucks, tubulars, and/or pipes used to compositionally move the pelletized diverting agent particulates from one location to another, any pumps, compressors, or motors (e.g., topside or downhole) used to drive the pelletized diverting agent particulates into motion, any valves or related joints used to regulate the pressure or flow rate of the pelletized diverting agent particulates (or fluids containing the same pelletized diverting agent particulates), and any sensors (i.e., pressure and temperature), gauges, and/or combinations thereof, and the like. The disclosed pelletized diverting agent particulates may also directly or indirectly affect the various downhole equipment and tools that may come into contact with the pelletized diverting agent particulates such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

To facilitate a better understanding of the present disclosure, the following examples of certain aspects of some of the systems and methods are given. In no way should the following examples be read to limit, or define, the entire scope of the disclosure.

Example 1

Tests were run to determine whether or not the pelletized diverting agent would hold together when placed in water. First, laboratory samples of the pelletized diverting agents were prepared. In this example, the pelletized diverting agents were prepared using a hand press and a bench-top unit obtained from LFA Machines Oxford LTD. The pelletized diverting agents were made using a commercially available PVA. The pelletized diverting agents were tested in room temperature tap water. The results are provided in Table 1.

Where the table says solid, that is meant to represent that there was no change in the pelletized diverting agent. Where the table says partial degradation, that means that the pelletized diverting agent experienced some type of degradation (i.e. deagglomeration, dissolution, etc.).

TABLE 1

| Binder | 5 Minutes | 1 Hour | 3 Hours |
|---|---|---|---|
| None | Solid | Solid | Partial Degradation |
| Methylcellulose | Partial Degradation | — | — |
| Firmapress | Solid | Solid | Partial Degradation |

Note:
According to the manufacturer, Firmapress is a microcrystalline cellulose, magnesium stearate, silica dioxide, and di-calcium phosphate.

Example 2

A dissolution test was performed to demonstrate the increase in rate of dissolution when a dissolution accelerator is included in the pelletized diverting agent. These tests were performed using a commercially available PVA. The tests were performed at temperatures of about 110° F. (43° C.) and about 130° F. (54° C.). The results show, that dissolution accelerators increase the dissolution of the pelletized diverting agents. Additionally, it may be assumed that dissolution may be more rapid at higher temperatures. The dissolution percentages were obtained by comparing the weight of the pelletized diverting agent before the dissolution test was performed and after the dissolution test was performed. The dissolution percentages of the pelletized diverting agent are shown in Table 2.

TABLE 2

| Temperature | Additives | | | | |
| --- | --- | --- | --- | --- | --- |
| | None | 20% Citric Acid | 5% EDTA | 5% Sulfamic Acid | 20% Sucrose |
| 110° F. | 30% | 40% | 41% | — | — |
| 130° F. | 49% | 59% | 61% | 57% | 57% |

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular examples disclosed above are illustrative only, as the present disclosure may be modified and practiced in different but equivalent manners apparent to those skilled in the art having the benefit of the teachings herein. Although individual examples are discussed, the disclosure covers all combinations of all those examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A treatment fluid comprising:
   a base fluid; and
   a pelletized diverting agent comprising:
     a degradable polymer, wherein the degradable polymer comprises polyvinyl alcohol; and
     a binder, wherein the binder comprises at least one material selected from the group consisting of sucrose, gelatin, starch, microcrystalline cellulose, and any combinations thereof and wherein the pelletized diverting agent is formed from an agglomeration of smaller polyvinyl alcohol particulates.

2. The treatment fluid of claim 1, wherein the pelletized diverting agent further comprises a dissolution accelerator in an amount of about 1% to about 30% by weight of the pelletized diverting agent.

3. The treatment fluid of claim 2, wherein the pelletized diverting agent further comprises a dissolution accelerator selected from the group consisting of an inorganic acid, a solid organic acid, and a simple saccharide.

4. The treatment fluid of claim 1, wherein the pelletized diverting agent further comprises an additional degradable polymer, wherein the additional degradable polymer comprises at least one polymer selected from the group consisting of aliphatic poly(ester);
   poly(lactide); poly(glycolide); poly(c-caprolactone); poly (hydroxyester ether);
   poly(hydroxybutyrate); poly(anhydride); polycarbonate; polyol; poly(orthoester);
   poly(aminoacid); poly(ethyleneoxide); poly(phosphazene); poly(etherester), hydroxy propyl methylcellulose, pectin, polyethylene oxide, alginate, polycaprolactone, gelatinised starch-based material, polyester amide, polyamide, and any combination thereof.

5. The treatment fluid of claim 1, wherein the pelletized diverting agent has a $D_v50$ particle size of about 100 microns to about 10 millimeters.

6. The treatment fluid of claim 1, wherein the pelletized diverting agent further comprises a binder and wherein the binder is present in an amount of about 0.001% to about 10% by weight of the pelletized diverting agent.

7. The treatment fluid of claim 1, wherein the base fluid comprises water.

8. The treatment fluid of claim 1, further comprising an additional diverting agent, wherein the additional diverting agent has a $D_v50$ particle size that is smaller than the pelletized diverting agent.

9. The treatment fluid of claim 1, wherein the degradable polymer is present in an amount in the range of about 80% to about 100% by weight of the pelletized diverting agent.

10. The treatment fluid of claim 1, wherein the pelletized diverting agent further comprises inert dissolvable materials.

11. The treatment fluid of claim 10, wherein the inert dissolvable materials are present in an amount in the range of about 1% to about 50% by weight of the pelletized diverting agent.

12. The treatment fluid of claim 1, wherein the binder is microcrystalline cellulose.

13. A treatment fluid comprising:
    a base fluid;
    a pelletized diverting agent comprising:
      a degradable polymer, wherein the degradable polymer comprises polyvinyl alcohol, wherein the pelletized diverting agent is formed from an agglomeration of smaller polyvinyl alcohol particulates, and wherein the pelletized diverting agent has a particle size of about 100 microns to about 10 millimeters;
      a dissolution accelerator; and a binder, wherein the binder comprises at least one material selected from the group consisting of sucrose, gelatin, starch, microcrystalline cellulose, and any combination thereof.

14. The treatment fluid of claim 13, further comprising an additional diverting agent wherein the additional diverting agent has a $D_v50$ particle size that is smaller than the pelletized diverting agent.

15. The treatment fluid of claim 14, wherein the additional diverting agent comprises a degradable polymer, wherein the degradable polymer comprises at least one polymer selected from the group consisting of aliphatic poly(ester); poly(lactide); poly(glycolide); poly(c-caprolactone); poly(hydroxyester ether); poly(hydroxybutyrate); poly(anhydride); polycarbonate;

polyol; poly(orthoester); poly(aminoacid); poly(ethyleneoxide); poly(phosphazene);

poly(etherester), hydroxy propyl methylcellulose, pectin, polyethylene oxide, alginate, polycaprolactone, gelatinised starch-based material, polyester amide, polyamide, and any combination thereof.

16. The treatment fluid of claim 13, wherein the degradable polymer is present in an amount in the range of about 80% to about 100% by weight of the pelletized diverting agent.

17. The treatment fluid of claim 13, wherein the binder is present in an amount of about 0.001% to about 10% by weight of the pelletized diverting agent.

18. The treatment fluid of claim 13, wherein the dissolution accelerator is in an amount of about 1% to about 30% by weight of the pelletized diverting agent.

19. The treatment fluid of claim 18, wherein the dissolution accelerator comprises at least one dissolution accelerator selected from the group consisting of an inorganic acid, a solid organic acid, and a simple saccharide.

20. The treatment fluid of claim 13, wherein the binder is microcrystalline cellulose.

* * * * *